United States Patent [19]

Coates

[11] Patent Number: 4,893,887
[45] Date of Patent: Jan. 16, 1990

[54] HOLOGRAPHIC IMAGE TRANSFER PROCESS

[75] Inventor: Don M. Coates, Midlothian, Va.

[73] Assignee: E. I. Du Pont de Nemours and Company, Wilmington, Del.

[21] Appl. No.: 560,747

[22] Filed: Dec. 12, 1983

[51] Int. Cl.⁴ .......................... G03H 1/04; G02B 5/18
[52] U.S. Cl. ................................. 350/3.6; 350/162.17
[58] Field of Search .................... 350/3.6, 3.7, 162.17, 350/168; 428/250, 328

[56] References Cited

U.S. PATENT DOCUMENTS

| | | | |
|---|---|---|---|
| 3,658,526 | 4/1972 | Haugh | 96/27 |
| 4,215,170 | 7/1980 | Oliva | 428/328 |
| 4,250,209 | 2/1981 | DeLeeuw et al. | 427/250 |
| 4,250,217 | 2/1981 | Greenaway | 350/168 |
| 4,310,591 | 1/1982 | Lee et al. | 428/283 |
| 4,313,984 | 2/1982 | Moraw et al. | 428/13 |
| 4,352,706 | 10/1982 | Miller | 156/233 |

FOREIGN PATENT DOCUMENTS 488652 4/1976 Australia .
WO83/00653 3/1983 PCT Int'l Appl. .

OTHER PUBLICATIONS

High Technology, vol. 4, No. 2, Aug. 1982, pp. 68–73.
Wall Street Journal, Jun. 30, 1982, p. 14.

Primary Examiner—John K. Corbin
Assistant Examiner—David J. Edmondson

[57] ABSTRACT

A supported thin metal hologram is formed and mounted on a substrate using an adhesive. In a preferred aspect, the hologram is covered with a transparent resin which preferably is identical to the adhesive.

3 Claims, 2 Drawing Sheets

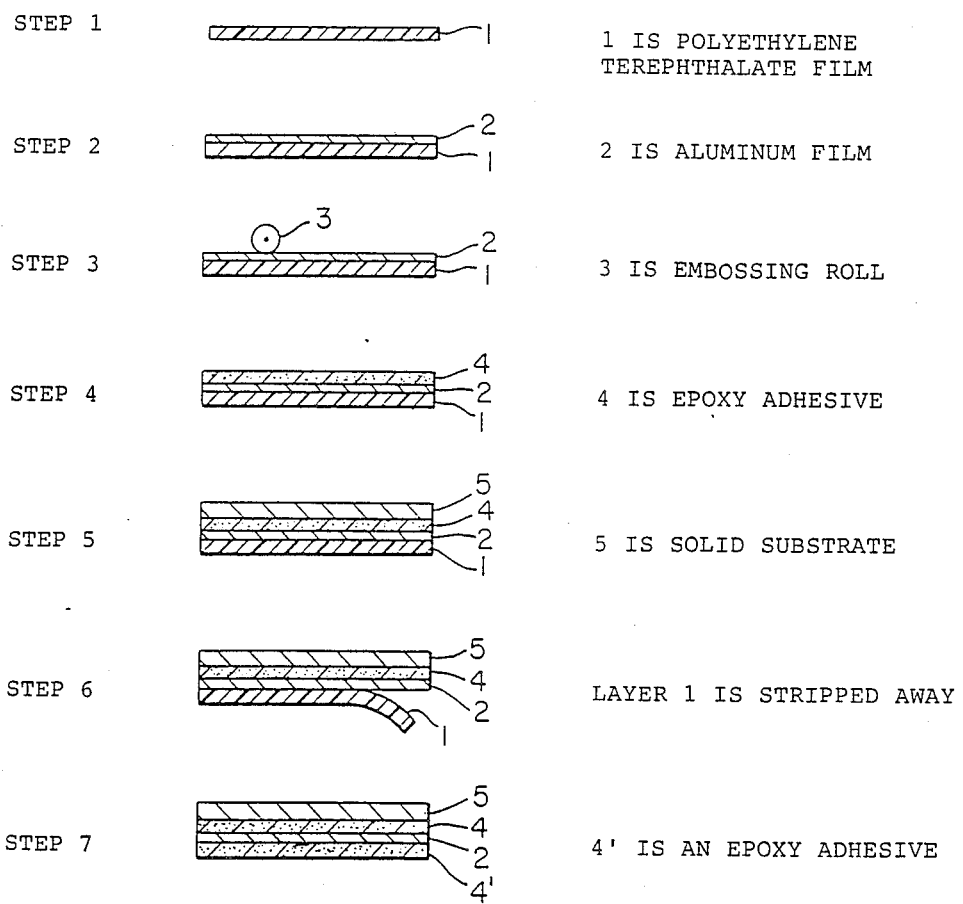

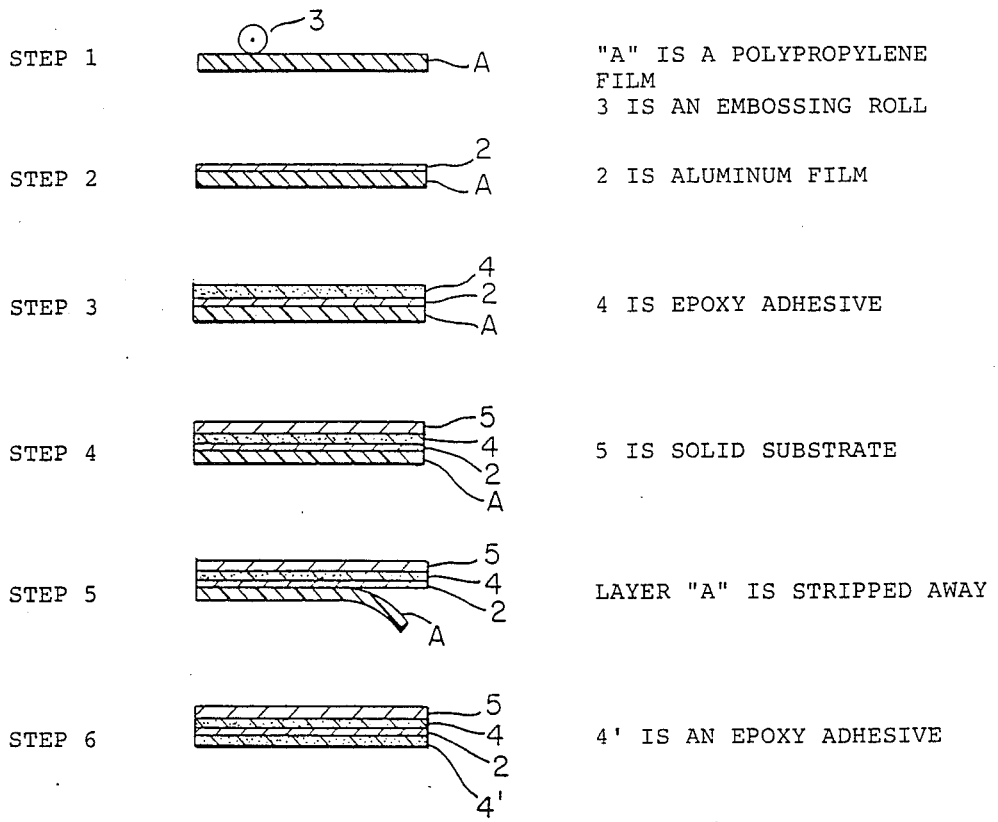

HOLOGRAPHIC IMAGE TRANSFER PROCESS

BACKGROUND OF THE INVENTION

1. Field of the Invention

The present invention relates to a metallic reflecting hologram supported in a transparent matrix and its method of preparation.

2. Prior Art

U.S. Pat. No. 3,658,526 discloses preparing copies of a hologram using a photopolymer as the copy material.

U.S. Pat. No. 4,215,170 discloses a process of metallizing a substrate wherein a transfer member is metallized by vacuum deposition of the metal, a varnish is applied to the metal and the resulting assembly applied to the final substrate. The varnish is cured and the transfer member is removed leaving the metallized substrate.

U.S. Pat. No. 4,250,209 discloses a process for metallizing a substrate wherein a polymeric film is treated with a release agent, and a layer of metal is vacuum deposited over the release agent. An adhesive is applied to the metal, the adhesive is adhered to a substrate, and the polymeric film removed.

U.S. Pat. No. 4,313,984 discloses a laminated identity card containing core layers carrying security markings.

SUMMARY OF THE INVENTION

The present invention discloses a metallic reflecting hologram and its preparation by use of a die having a holographic image formed in the embossing surface thereof. Using the die, an image is replicated into a metallic film. A plastic adhesive is applied as a liquid to the metal hologram (film) and the metal hologram applied to a substrate and the liquid adhesive cured to convert it to a solid. A liquid is applied to the hologram surface and cured to convert it to a solid.

DESCRIPTION OF THE DRAWINGS

FIG. 1 is a pictorial representation of the process steps carried out in accordance with Example 1.

FIG. 2 is a pictorial representation of the process steps carried out in accordance with Example 3.

DETAILED DESCRIPTION

The metallic holograms of the present invention can be applied to any flat surface. Suitable surfaces include, but are not limited to, paper, wood, sheet metal, glass, plastic films, Tyvek ® (a spunbonded polyolefin sheet material sold by Du Pont), etc. Generally the holograms of the present invention are useful in marking valuable documents such as money or passports to prevent their being counterfeited and for mass media images (illustrations) in magazines, books, or on advertising material.

The first step in producing the metallic holograms of the present invention is to prepare a die for forming the hologram. The master from which the die is fabricated is prepared by conventional means. The preferred method is to coat an incompletely cross-linked photopolymer on a glass plate. The light from a laser is split into two beams which are collimated. One collimated beam is reflected from the object to be holographed onto the partially cross-linked photopolymer. The other beam of collimated light is transmitted directly onto the partially cross-linked photopolymer and serves as a reference beam. Upon exposure, the photopolymer forms a pattern of raised areas and valleys which are a holograph of the object being holographed. The holograph is sprayed with colloidal silver, placed in a bath, and electroplated with nickel. The thusly formed nickel die is separated from the master and mounted on a pressure roll or other stamping means.

The metal hologram can be fabricated using the die by any of several means. One method is to vacuum deposit a metal layer directly on the die. Liquid adhesive is applied over the metallized die. The adhesive-coated metal layer, while still attached to the die, is then pressed against a substrate, the adhesive cured, and the die removed. The resulting metal hologram may then be covered with additional liquid adhesive, which is cured after application, to provide protection for the hologram.

Another method for producing the metallic hologram is to metallize a plastic film by vacuum metallization or by sputtering. The deposited metal may be continuous or discontinuous. The metallized film is embossed on the metallized surface using the die. A liquid adhesive is applied to the metallized surface, and the adhesive-coated surface of the composite is pressed against a substrate. The adhesive is cured and the plastic film removed. The embossed metal hologram is covered with a layer of the liquid adhesive which is cured to complete the process.

Another technique for forming the metallic hologram is to emboss a thermoplastic film with the die and then vacuum deposit a metal onto the embossed film. A liquid adhesive is applied to the deposited metal; the film, metal and adhesive is pressed against a substrate and the adhesive cured. The film is removed and the metal hologram covered with more of the liquid adhesive which is cured to solidify it.

Any transparent adhesive which is a liquid curable to a solid can be used in the present invention. In a preferred aspect the adhesive is a cross-linkable polymer that cures to form a tough solvent-resistant film. Suitable adhesives include, but are not limited to, epoxy resins, polyurethane resins, acrylic resins, and alkyd resins.

The metal hologram is very thin, about 0.02 to 0.1 micron in thickness. This thinness is necessary when using the two film transfer techniques described above because the metal surface which was not in contact with the die surface will ultimately be the reflective holographic surface; and if the metal is much thicker, it will not adequately reproduce the detailed topology of the holographic master from which the die was fabricated. Aluminum and nickel base alloys such as Hastelloy ® are the preferred metals.

Since the holographic image information is contained in the wave pattern, it would be possible to "pirate" the image by making an electroform or casting of the wave surface. To prevent such a counterfeiting ploy, the wave pattern must be covered with a protective layer. Additionally, this protective layer should have chemical characteristics similar to the adhesive (i.e., solubility, adhesion). Such is preferred to prevent the removal of the protective layer. For example, if various solvents are tried to dissolve the protective layer, the adhesive layer will be destroyed as well, thus preventing access to the image. The use of the protective layer could, of course, be eliminated for end uses that do not require high security. In such cases, the metal should be resistant to oxidation and the elements. Hastelloy ® has been found to be quite durable and is suitable for direct exposure to the elements. Otherwise, aluminum is adequate for the metal when it is covered by the protective layer.

EXAMPLES

A biaxially oriented 1 mil thick polyethylene terephthalate film was vacuum metallized with 0.025 micron aluminum using a conventional commercial metallizing unit. The vacuum vessel was set to 0.012 mm Hg rather than 0.002 mm Hg so to produce a product with a low metal-to-film adhesion.

The metallized film was then embossed on the metallized surface with the desired holographic image. Equipment for this embossing process comprised two steel rolls heated to 90° C. One of the rolls was covered with a nickel sleeve which was electroformed from a photopolymer coated glass plate hologram. The film to be embossed is fed between the pressure loaded rollers with the metallized side against the nickel sleeve.

Next, equal parts of epoxy FE-7235A and B (H. B. Fuller Co.) structural adhesive were mixed. This is a very clear epoxy resin that has appropriate optical, viscosity, adhesion, and flexibility characteristics for use in the present invention. The mixed resin was then applied evenly to the image areas on the metallized side of the polyester film. Then the film was cut up and individual image areas were pressed onto a variety of surfaces which were ultimately to support the holographic image. Among the surfaces were notebook paper, cardboard, and Tyvek ®. Pressure was maintained on the film/adhesive/substrate surface sandwich by use of weights. The adhesive resin was cured by heating at 60° C. for three hours. The polyethylene terephthalate film was peeled off of the images by hand. Left behind were exact replicas of the original holographic image on the support surface complete with reflecting aluminum surfaces.

Finally, a fresh batch of the epoxy resin was made as before. The transferred surfaces were then smoothly top coated with the resin and cured at 60° C. for one hour. The resulting images were bright and very durable.

EXAMPLE 2

Example 1 is repeated except Spensole ® L53 moisture cure urethaneresin (Spencer Kellogg Co.) (no further description available) is substituted for the two part epoxy resin and cured at the same conditions as used for Ex. 1.

EXAMPLE 3

Biaxially oriented polypropylene film of 2 mil thickness was embossed with the embossing rolls used in Example 1 heated to 72° C. The embossed film was vacuum metallized with aluminum using a conventional metallizing unit at the standard vacuum setting to provide a 0.025 micron thick aluminum coating.

Next, equal parts of epoxy FE-7235A and B were mixed. The mixed resin was applied evenly to the image areas on the metallized side of the polypropylene film. The film was cut up and the image areas were pressed on to various surfaces which were ultimately to support the holographic image. Among the surfaces were notebook paper, cardboard, and Tyvek ®. Pressure was maintained on the film of resin/substrate surface sandwich by means of weights. The adhesive resin was cured by heating at 60° C. for three hours.

The polypropylene film was peeled off the images by hand. Left behind were exact replicas of the original holographic image on the support surface complete with reflecting aluminum surface.

Finally, a fresh batch of the epoxy resin is made as before. The transferred surface was then smoothly top coated with the resin and cured at 60° C. for one hour. The resulting images were bright and very durable.

Using these techniques, a hologram similar in size and complexity to the Department of the Treasury seal found on the face of U.S. currency was applied to the surface of security paper as described in U.S 4,310,591. The image was bright and durable and judged acceptable for its intended use as an anti-counter-fitting device.

I claim:

1. A process for applying a metallic hologram to a solid substrate which comprises the following steps in sequence:
    (a) forming a thin metallic hologram;
    (b) coating a first side of said thin metallic hologram with a crosslinkable liquid adhesive resin;
    (c) contacting the coating on the thin metallic hologram with a solid substrate;
    (d) curing said crosslinkable liquid adhesive resin to form a tough solvent-resistant film while said metallic hologram and said solid substrate are in contact with said crosslinkable liquid adhesive resin;
    (e) coating a second side of the thin metallic hologram with a transparent crosslinkable liquid adhesive resin; and
    (f) curing the transparent liquid adhesive resin to form a tough solvent-resistant film while it is in contact with said second side of the thin metallic hologram.

2. A process for applying a metallic hologram to a solid substrate which comprises the following steps in sequence:
    (a) forming a thin metallic hologram on the surface of a metal die by deposition of metal onto the surface of a metal die that contains a holographic image, said metallic hologram having two major sides, one of said major sides hereinafter designated: first side, being out of contact with the surface of the metal die, the second of said major sides hereinafter being designated: second side, being initially in contact with the surface of the metal die;
    (b) coating the first side of said thin metallic hologram with a crosslinkable liquid adhesive resin;
    (c) contacting the coating on the thin metallic hologram with a solid substrate;
    (d) curing said crosslinkable liquid adhesive resin to form a tough solvent-resistant film while said metallic hologram and said solid substrate are in contact with said crosslinkable liquid adhesive resin, and said metal die is in contact with said second side;
    (e) removing said metallic die from contact with said second side;
    (f) coating said second side with a crosslinkable liquid adhesive resin; and
    (g) curing the coating applied in step (f) to form a tough solvent-resistant film.

3. A process for applying a metallic hologram to a solid substrate which comprises the following steps in sequence:
    (a) forming a thin metallic hologram by deposition of a metal film onto a thermoplastic layer and then embossing the metal film with a holographic image, said metallic hologram having two major sides, one of said major sides hereinafter designated: first side, being out of contact with the thermoplastic layer, the second of said major sides hereinafter being designated: second side, being initially in contact with the thermoplastic layer;
(b) coating the first side of said thin metallic hologram with a crosslinkable liquid adhesive resin;
(c) contacting the coating on the thin metallic hologram with a solid substrate;
(d) curing said crosslinkable liquid adhesive resin to form a tough solvent-resistant film while the first side of said metallic hologram and said solid substrate are in contact with the crosslinkable liquid adhesive resin and said thermoplastic layer is in contact with said second side;
(e) removing said thermoplastic layer from contact with said second side;
(f) coating said second side with a crosslinkable liquid adhesive resin; and
(g) curing the coating applied in step (f) to form a tough solvent-resistant film.

* * * * *